(12) United States Patent
Kuan

(10) Patent No.: US 6,771,606 B1
(45) Date of Patent: Aug. 3, 2004

(54) NETWORKING SWITCHING SYSTEM ON-LINE DATA UNIT MONITORING CONTROL

(75) Inventor: Bing-Sung Kuan, Hsinchu (TW)

(73) Assignee: D-Link Corp., Hsinchu (TW)

( * ) Notice: Subject to any disclaimer, the term of this patent is extended or adjusted under 35 U.S.C. 154(b) by 784 days.

(21) Appl. No.: 09/606,142

(22) Filed: Jun. 29, 2000

(51) Int. Cl.⁷ .............................. H04L 12/26; H04L 1/00
(52) U.S. Cl. .................. 370/248; 370/395.31; 709/224; 713/201
(58) Field of Search ................ 370/248, 252, 370/351, 389, 392, 395.3, 395.31, 395.32, 400, 401, 254, 255, 229, 230, 235, 428, 475, 242; 709/220, 221, 223, 224, 227, 228, 238, 225; 713/153, 154, 155, 200, 201

(56) References Cited

U.S. PATENT DOCUMENTS

| | | | | |
|---|---|---|---|---|
| 5,872,783 A | * | 2/1999 | Chin ..................... | 370/395.32 |
| 6,141,738 A | * | 10/2000 | Munter et al. ............. | 711/206 |
| 6,570,877 B1 | * | 5/2003 | Kloth et al. ............... | 370/392 |
| 6,600,724 B1 | * | 7/2003 | Cheng ...................... | 370/256 |
| 6,628,623 B1 | * | 9/2003 | Noy ......................... | 370/255 |

* cited by examiner

Primary Examiner—Brian Nguyen
(74) Attorney, Agent, or Firm—Bacon & Thomas, PLLC

(57) ABSTRACT

A network switching system on-line data unit monitoring control in which a network switch is controlled by the settings from the user to establish a forwarding configuration table subject to a forwarding table built therein, and to forward passing-by data units to a CPU in the network switch, enabling the CPU to capture, collect, monitor and forward data units from particular nodes in time subject to the parameter values set in the forwarding configuration table.

7 Claims, 5 Drawing Sheets

| node | port |
|------|------|
| A | CPU |
| ⋮ | ⋮ |

Fig. 6

| node | port | capture port | state | trap |
|------|------|--------------|-------|------|
| A | 1 | 5 | 3 | X |
| ⋮ | ⋮ | ⋮ | ⋮ | ⋮ |

Fig. 7

NETWORKING SWITCHING SYSTEM ON-LINE DATA UNIT MONITORING CONTROL

BACKGROUND OF THE INVENTION

1. Field of the Invention

The present invention relates to a network switching system on-line data unit monitoring control, which learns, captures, collects, monitors, or forwards data units from a node in the network assigned by the user subject to the parameter values in the columns in a forwarding configuration table set by the user.

2. Description of the Prior Art

In an Ethernet, as shown in FIG. 1, at least one switch 30 is used to connect different Ethernet Segments 11, 12, 13, and 14. The network switch 30 can be a network apparatus having a plurality of ports. In a network switching system, network apparatus or stacks of network apparatus communicate with one another by means of same BPDUs (Bridge Protocol Data Units) The network switch 30 leans source address and destination address of all incoming data units through a controller or software installed therein, establishes or updates a Forwarding Table in its controller or software, and forwards incoming data units to the corresponding destination subject to the Forwarding Table, i.e., when the ports 1, 2, 3 and 4 respectively received data units from nodes A, B, C and D at Segments 11, 12, 13 and 14, the switch 30 collect the destination addresses and source addresses of the data units with the Forwarding Table 31, see FIG. 2, and proceeds with the following steps:

(1) If the data unit's source address does not exist in the Forwarding Table 31, the switch 30 records the source address and the corresponding port in the Forwarding Table 31 to complete dynamic registration of the source address of the data unit;

(2) If the data unit's source address already exists in the Forwarding Table 31, the switch 30 immediately updates the column of port in the Forwarding Table 31 to complete dynamic updating of the port of the data unit;

(3) If the destination address of the data unit belongs to one node of same segment, the switch 30 discards the data unit to complete filtering of the data unit;

(4) If the destination address of the data unit already exists in the Forwarding Table 31, the switch immediately forwards the data unit to the port of the destination address to complete forwarding of the data unit;

(5) If the destination address of the data unit does not exist in the Forwarding Table 31, the switch 30 flood the destination address to every port in use, and the switch 30 records the destination address in the Forwarding Table 31 to complete dynamic registration of the source address of the data unit if the node of the destination address responds to the data unit.

By means of the aforesaid learning procedure, the switch keeps the Forwarding Table 31 in completion and accuracy, and provides the necessary data to the nodes in the network for communication subject to the information in the Forwarding Table 31. Therefore, when a data unit enters the switch 30 after all nodes have been learned, the switch directly forwards the data unit to the node of the destination address subject to the data recorded in the Forwarding Table. However, because current network switches are made having more and more number of ports, the corresponding Forwarding Table becomes more and more big, and the MIS (Management Information System) people must pay extra effort to establish the corresponding controllable Forwarding Table. When establishing the corresponding controllable Forwarding Table, errors may occur. Further, the learning function causes the MIS people unable to lock the corresponding Forwarding Table easily, and unauthorized node's source address may occupy the memory space of the Forwarding Table. Further, because conventional network switches have the function of auto aging out timer, they cannot effectively handle the information source upon the trial of a hacker, thereby causing a network security management problem.

Because the aforesaid data unit learning and forwarding techniques only allow network switches to collect and manage data units at one port, to let their network switch controller provide a counter, or to monitor traffic utilization and size by means of external Shiffer or mirror, conventional network switches cannot effectively monitor data units from different network segments or a particular node in a particular network segment, keeping the general direction of a particular node under control.

Because external apparatus, such as Hub, Shiffer, PC, and etc., are used to collect and analyze on-line data units during development of network switch products, the procedure of developing network switch products is complicated, and the problem cannot be effectively analyzed and handled immediately upon its occurrence during the experimentation stage of the developed network switch products.

SUMMARY OF THE INVENTION

The present invention has been accomplished under the circumstances in view. It is one object of the present invention to provide a network switching system on-line data unit monitoring control, which enables the network switching system, in addition to data unit learning and forwarding functions, to monitor data units from different network segments directly, keeping the general direction of particular nodes under control. It is another object of the present invention to provide a network switching system online data unit monitoring control, which locks a particular node in the network to capture, collect or analyze data units when an abnormality (for example, spanning tree continuously making topology chain or control frame forwarding/receiving abnormality) or unauthorized access (for example, the intrusion of a hacker, or a simple intrusion) occurs in the network, so as to effectively ensure the security of the network. According to the present invention, the network switch is controlled by the settings from the user to establish a forwarding configuration table subject to the forwarding table built therein, and to forward passing-by data units to a CPU in the network switch, enabling the CPU to capture, collect, monitor and forward data units from particular nodes in time subject to the parameter values set in the forwarding configuration table.

BRIEF DESCRIPTION OF THE DRAWINGS

FIG. 6 illustrates a Forwarding Table used in the network switch constructed according to the present invention.

FIG. 7 illustrates a Forwarding Configuration Table set in the network switch constructed according to the present invention.

DETAILED DESCRIPTION OF THE PREFERRED EMBODIMENT

Figures 1, 2:
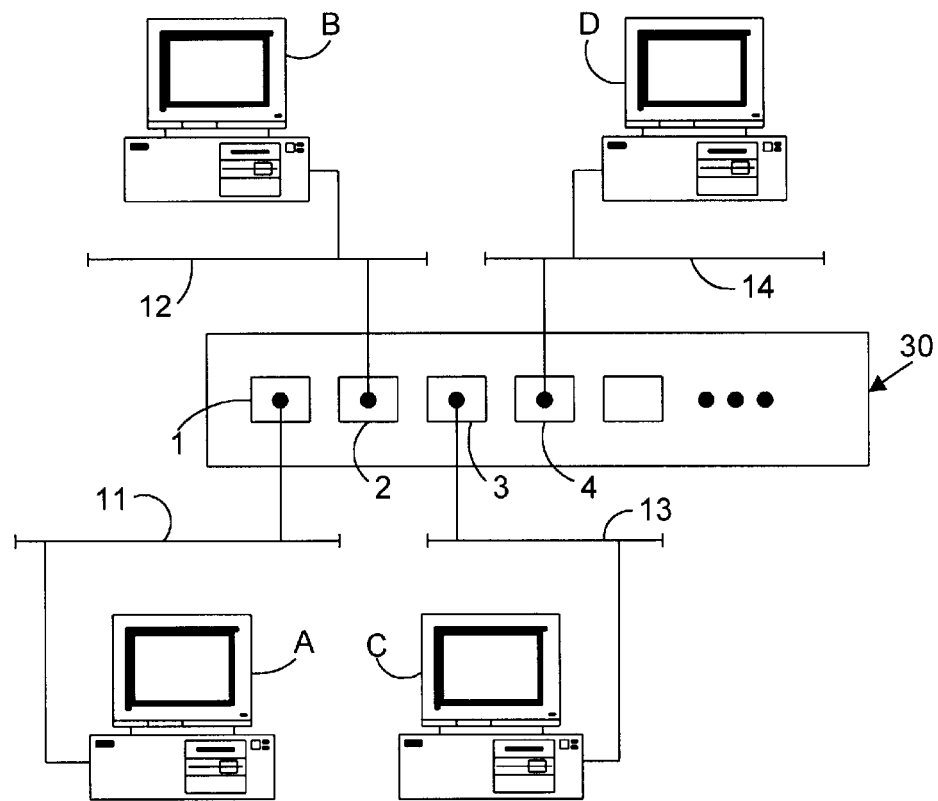
FIG. 1 illustrates the wiring of a network switch in an Ethernet according to the prior art.
FIG. 2 illustrates a Forwarding Table used in a conventional network switch.
Figures 3, 4:
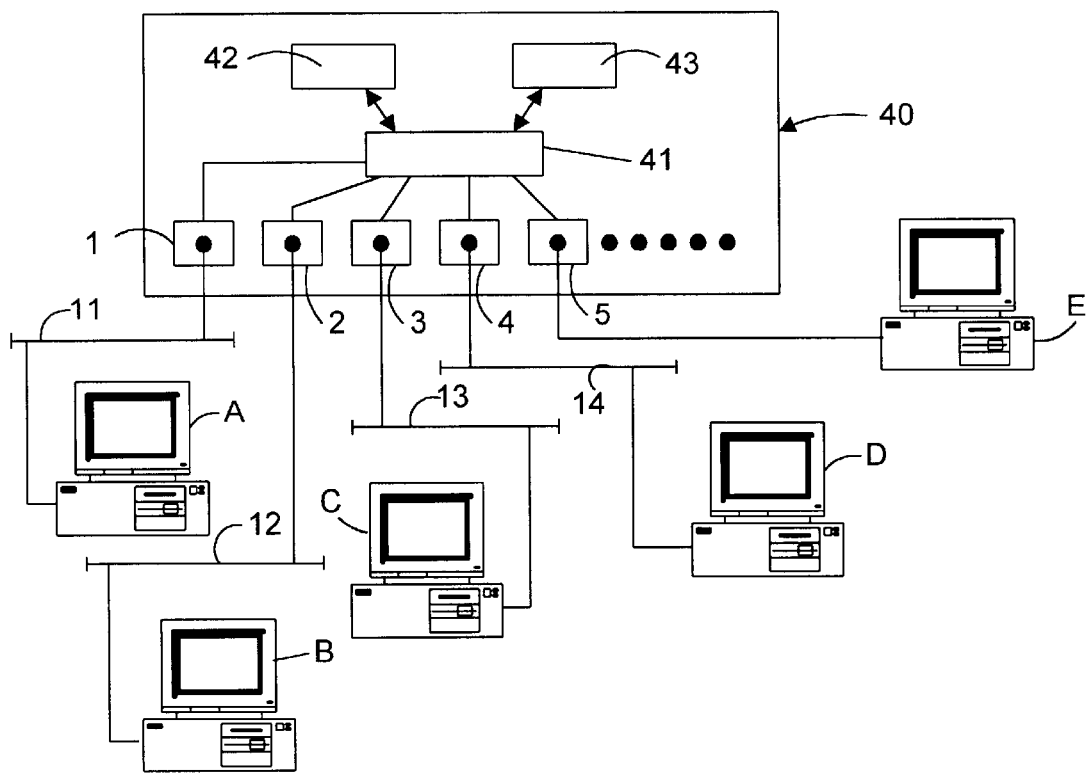
FIG. 3 illustrates the wiring of a network switch in an Ethernet according to the present invention.
FIG. 4 illustrates a Forwarding Configuration Table according to the present invention.
Figure 5:
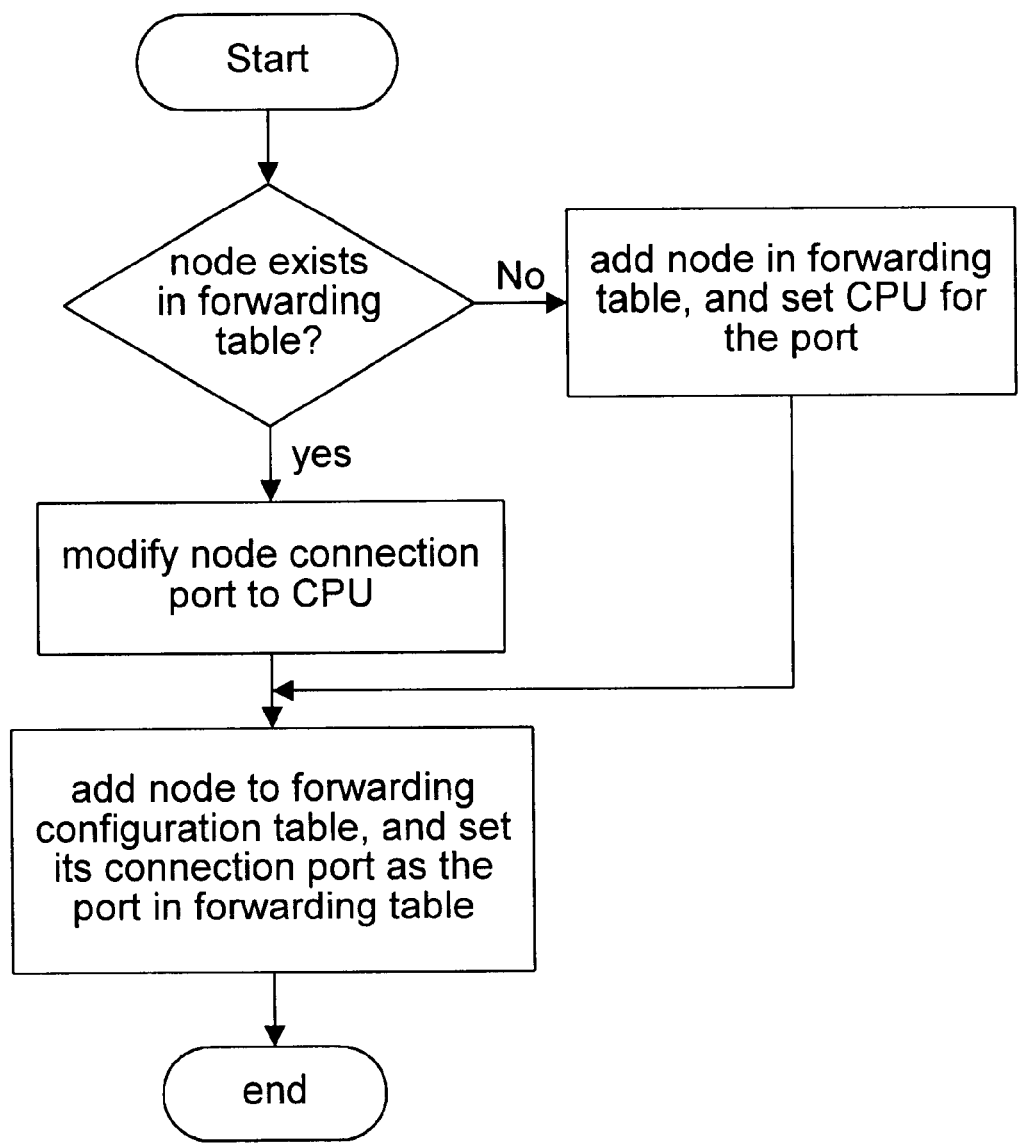
FIG. 5 as is a flow chart showing the processing process before monitoring the assigned node according to the present invention.

Referring to FIG. 3, a network switching system on-line data unit monitoring control in which a network switch 40 is controlled by the settings from the user to establish a Forwarding Configuration Table 43 subject to a Forwarding Table 42 built therein and to forward passing-by data units to a CPU 41, enabling the CPU 41 to capture, collect, monitor and forward data units from particular nodes A and C in time subject to the parameter values set in the Forwarding Configuration Table 43.

Referring to FIG. 4, the Forwarding Configuration Table 43 comprises:

(1) A Node Column: for storing the nodes to be monitored, i.e., the source addresses.

(2) A Port Column: for storing the ports corresponding to the nodes to be monitored.

(3) A Capture Port Column: for storing the destination port when capturing data units or a local buffer, so as to use the capture ports to capture data units from the node A or C of the segment 11 or 13 through the port under monitoring.

(4) A State Column: for storing data unit collecting state parameters for the nodes set in the Node Column to determine collecting methods, so that the state parameters collect or filter data units from the nodes under monitoring, the collecting methods including:
  i. neither to collect nor to filter;
  ii. not to collect but to filter;
  iii. to collect but not to filter;
  iv. to collect and to filter; and
  v. not to start monitoring the node.

(5) A Trap Column; for storing parameters to trap the switch 40 or to inform the user of the change through the user's interface at the switch 40 when the port of the node is changed.

According to the present preferred embodiment, the switch 40 has the functions of learning and forwarding all data units from the network. When the ports 1, 2, 3 and 4 of the switch 40 receive data units from the nodes A, B, C and D of the network segments 11, 12, 13 and 14, the CPU 41 of the switch 40 collate the destination and source addresses of the data units with the recorded addresses in the Forwarding Table 42, and to complete the processing processes of dynamic registration, updating and filtering of source addresses and destination addresses of the data units, thereby keeping the Forwarding Table 42 in accuracy, and also to provide data required for network connection to the nodes in the network subject to the information of the Forwarding Table 42 and to directly forward data units to the respective destination addresses subject to the data recorded in the Forwarding Table 42.

Figure 8:
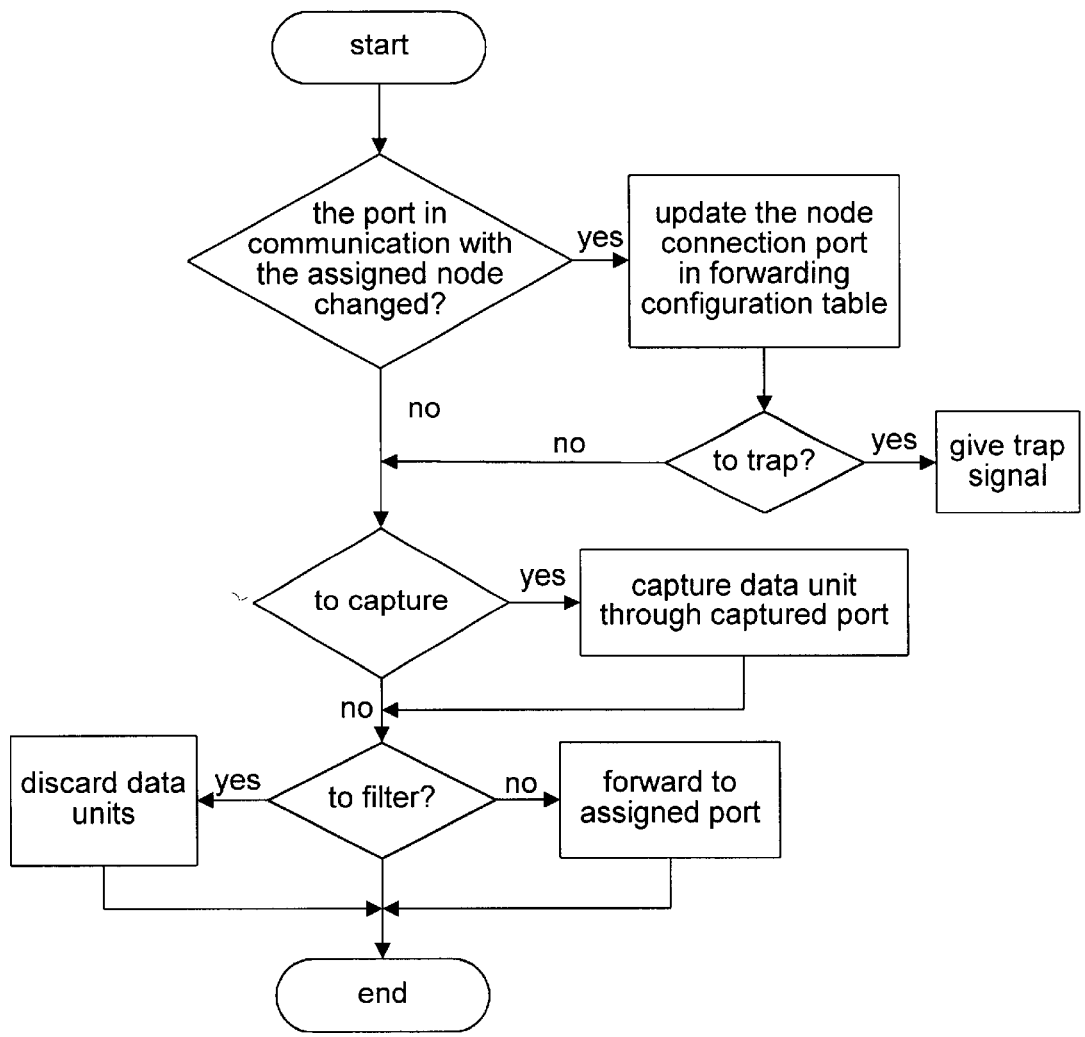
FIG. 8 is a flow chart showing the on-line monitoring process employed to the assigned node according to the present invention.

When wishing to monitor data units from a particular node A through the switch 40, the user can input parameters for the node A through a network terminal, and then download the parameters to the network switch. Alternatively, the user can use a network management program to set parameters for the node A directly. At this time, as shown in FIG. 6, the network switch 40 immediately modifies the record in the Forwarding Table 42, to change the port column corresponding to the node column A to the state of in communication with the CPU 41 of the switch 40. After the node A has been set as an object under monitoring, the CPU 41 immediately establishes a Forwarding Configuration Table 43 subject to the condition of the Forwarding Table 42, as shown in FIG. 7, and then uses the other parameter values set by the user in the Forwarding Configuration Table 43 to proceed with the monitoring and forwarding processing procedure indicated in FIG. 8 when the source address or destination address of the data units passing through the switch 40 is detected of the node A. The monitoring and forwarding processing procedure includes the steps of:

(1) Checking received data units to see if the node A's communication port has been changed or not, and then updating the port parameters in the Forwarding Configuration Table 43 corresponding to the node A if the port has been changed, and then judging if there are trap parameters set in the Trap Column in the Forwarding Configuration Table 43 or not, so as to inform the user of the change through the user's interface at the switch 40 if positive, or to proceed to the following step (2) if negative;

(2) Checking the port 5's parameters set in the Capture Port Column in the Forwarding Configuration Table 43, so as to forward received data units to the port 5, enabling data units to be captured by the device E being connected to the port 5 (see FIG. 3), or (3) Checking the parameter values set in the State Column in the Forwarding Configuration Table 43 so as to filter or collect the data units received subject to the parameter pairs, and then to forward the data units to the corresponding port at the switch 40 subject to the port parameters set in the Port Column in the Forward Configuration Table 43 after completion of the aforesaid data unit filtering or collecting processing process, enabling the data units to be further forwarded to the corresponding destination address through the corresponding port.

When an unauthorized node enters the switch, the switch immediately traps the network control or the user's interface to give a warning signal to the network manager subject to the variation of the corresponding port, so that the network manager can analyze if there is a hacker intruding the node or switching the node to another network segment. This method directly and effectively monitors data units from different network segments, so that the general direction of a particular node is under control, and the security of the network is assured. Further, a switch under development is capable of locking a particular node to capture and collect data units for in time monitoring and analyzing when encountering a problem, so that the problem can quickly be found out and settled.

It is to be understood that the drawings are designed for purposes of illustration only, and are not intended for use as a definition of the limits and scope of the invention disclosed.

What the invention claimed is:

1. A method for controlling the monitoring of an on-line data unit in a network switching system, which drives a network switch in a network, comprising the steps of:

establishing a fordwarding configuration table subject to a forwarding table built in the network switch according to settings from a user, and modifying values of a port column in the forwarding table corresponding to at least one node in the network under monitoring, enabling the at least one node under monitoring to be changed to a state of being in communication with a CPU (central processing unit) in the network switch, so that the CPU captures and monitors data units from the at least one node under monitoring subject to parameter values set in the forwarding configuration table, and then forwards captured and collected data units to a respective destination address through the network switch subject to the port column values in the forwarding configuration table corresponding to the at least one node under monitoring.

2. The method as claimed in claim 1 wherein said forwarding configuration table comprises a strap column for storing parameters to trap the network switch or to inform the user of the change through a user's interface at the network switch when a port corresponding to the node under monitoring is changed.

3. The method as claimed in claim 2 wherein said CPU immediately proceeds with a data unit monitoring and forwarding processing procedure subject to the parameter values set in said forwarding configuration table by the user when a source address or the destination address of the data units passing through said network switch detected by said CPU is of the node under monitoring, said monitoring and forwarding processing procedure including the step of checking if the port in communication with the node under monitoring has been changed or not, and then updating port parameters in said forwarding configuration table if the port in communication with the node under monitoring has been changed, and then judging if there are trap parameters set in the trap column in said forwarding configuration table or not, so as to inform the user of the change through the user's interface at the switch if positive, and then to forward the data units to the respective destination address through the port set in the port column in said forwarding configuration table.

4. The method as claimed in claim 1 wherein said forwarding configuration table further comprises a capture port column for storing a capture port assigned by the user, enabling the capture port to be used to capture data units coming from the port corresponding to the node under monitoring.

5. The method as claimed in claim 4 wherein when a source address or the destination address of the data units detected by said CPU at said network switch is of the node under monitoring, said CPU immediately checks the port's parameters set in the capture port column in said forwarding configuration table, enabling received data units to be captured by a device connected to the port for analysis and monitoring, and then forwards the data units to the respective destination address through the port set in the port column in said forwarding configuration table after the process of analysis and monitoring through the device connected to the port.

6. The method as claimed in claim 1 wherein said forwarding configuration table further comprises a state column for storing state parameters during data unit collecting from the node under monitoring, so that said CPU determine collecting methods to collect or filter data units from the node under monitoring subject to the state parameters stored in said state column.

7. The method as claimed in claim 6 wherein when a source address or the destination address of the data units detected by said CPU at said network switch is of the node under monitoring, said CPU immediately checks the parameter values set in said state column for the node under monitoring, so as to filter or collect the data units received subject to the parameter values set in said state column, and then to forward the data units to the respective destination address through the port set in the port column in said forwarding configuration table after completion of the step of filtering or collecting the data units received subject to the parameter values set in said state column.

* * * * *